(12) United States Patent
Bradley et al.

(10) Patent No.: US 7,700,684 B2
(45) Date of Patent: Apr. 20, 2010

(54) GRAFT FUNCTIONALIZED OLEFIN POLYMER DISPERSANT AND USES THEREOF

(75) Inventors: Joseph S. Bradley, Midlothian, VA (US); Michael A. Danylo, Midlothian, VA (US); Yoon Soo Song, Richmond, VA (US); Anthony F. Fagan, Chesterfield, VA (US)

(73) Assignee: Afton Chemical Corporation, Richmond, VA (US)

( * ) Notice: Subject to any disclaimer, the term of this patent is extended or adjusted under 35 U.S.C. 154(b) by 0 days.

(21) Appl. No.: 11/007,346

(22) Filed: Dec. 9, 2004

(65) Prior Publication Data

US 2006/0128875 A1 Jun. 15, 2006

(51) Int. Cl.
C08L 31/00 (2006.01)
(52) U.S. Cl. ...................... 524/556; 524/558
(58) Field of Classification Search .................. 524/556
See application file for complete search history.

(56) References Cited

U.S. PATENT DOCUMENTS

| | | | |
|---|---|---|---|
| 2,695,327 A | 11/1954 | Ziegler et al. |
| 3,576,898 A | 4/1971 | Blake et al. |
| 3,862,265 A | 1/1975 | Steinkamp et al. |
| 3,876,720 A | 4/1975 | Heilman et al. |
| 4,089,794 A | 5/1978 | Engel et al. |
| 4,137,185 A | 1/1979 | Gardiner et al. |
| 4,144,181 A | 3/1979 | Elliott et al. |
| 4,146,489 A | 3/1979 | Stambaugh et al. |
| 4,160,739 A | 7/1979 | Stambaugh et al. |
| 4,172,855 A | 10/1979 | Shubkin et al. |
| 4,320,019 A | 3/1982 | Hayashi |
| 4,340,689 A | 7/1982 | Joffrion |
| 4,357,250 A | 11/1982 | Hayashi |
| 4,382,007 A | 5/1983 | Chafetz et al. |
| 4,780,228 A | 10/1988 | Gardiner et al. |
| 4,803,003 A | 2/1989 | Chung |
| 4,863,623 A | 9/1989 | Nalesnik |
| 4,973,788 A | 11/1990 | Lin et al. |
| 5,055,213 A | 10/1991 | Germanaud et al. |
| 5,075,383 A | 12/1991 | Migdal et al. |
| 5,162,086 A | 11/1992 | Migdal et al. |
| 5,169,546 A | 12/1992 | Nalesnik et al. |
| 5,182,041 A | 1/1993 | Benfarmeo et al. |
| 5,188,745 A | 2/1993 | Migdal et al. |
| 5,230,834 A | 7/1993 | Gutierrez et al. |
| 5,284,988 A | 2/1994 | Schaerl, Jr. et al. |
| 5,384,371 A | 1/1995 | Caines et al. |
| 5,391,617 A | 2/1995 | Olivier et al. |
| 5,427,702 A | 6/1995 | Chung et al. |
| 5,429,757 A | 7/1995 | Mishra et al. |
| 5,451,636 A | 9/1995 | Olivier et al. |
| 5,516,849 A | 5/1996 | Caines et al. |
| 5,556,923 A | 9/1996 | Caines et al. |
| 5,563,118 A | 10/1996 | Mishra et al. |
| 5,670,462 A | 9/1997 | Barr et al. |
| 5,721,200 A | 2/1998 | Shirodkar et al. |
| 5,837,773 A | 11/1998 | Olivier et al. |
| 5,932,525 A | 8/1999 | Ney et al. |
| 6,100,224 A | 8/2000 | Peiffer et al. |
| 6,107,257 A * | 8/2000 | Valcho et al. ............... 508/221 |
| 6,107,527 A | 8/2000 | Stec et al. |
| 6,111,027 A | 8/2000 | Wright et al. |
| 6,715,473 B2 | 4/2004 | Ritchie et al. |
| 6,818,601 B1 * | 11/2004 | Lange ........................ 508/240 |
| 2004/0043909 A1 | 3/2004 | Goldblatt et al. |

FOREIGN PATENT DOCUMENTS

| | | |
|---|---|---|
| CA | 2021959 | 6/1991 |
| EP | 0 338 672 A1 | 10/1989 |
| EP | 338672 A1 * | 10/1989 |
| EP | 0 922 752 A2 * | 6/1999 |
| EP | 922752 A2 * | 6/1999 |
| JP | 52004507 | 1/1977 |
| JP | 53136006 | 11/1978 |
| JP | 54095404 | 7/1979 |
| JP | 55013777 | 1/1980 |
| JP | 61062509 | 3/1986 |
| JP | 01284593 | 11/1989 |
| JP | 02225596 | 9/1990 |
| JP | 05112791 | 5/1993 |
| JP | 11302322 | 11/1999 |
| JP | 11315296 | 11/1999 |

* cited by examiner

Primary Examiner—Robert D. Harlan

(57) ABSTRACT

A novel highly grafted, functionalized olefin polymer is provided comprising the reaction product of a method comprising reacting an acylating agent with a mixture comprising an olefin polymer having a number average molecular weight of between about 5,000 to about 100,000 and a diluent in the presence of a free radical initiator to provide an acylated olefin polymer which is further reacted with a polyamine to provide the grafted functionalized olefin polymer dispersant. Lubricating oil concentrates and compositions containing the highly grafted, functionalized olefin polymer and uses thereof also are provided.

13 Claims, No Drawings

GRAFT FUNCTIONALIZED OLEFIN POLYMER DISPERSANT AND USES THEREOF

TECHNICAL FIELD

This invention relates to a highly grafted, functionalized lubricant additive useful as an improved dispersant when employed in a lubricating oil composition.

BACKGROUND OF THE INVENTION

The art contains many disclosures on the use of polymer additives in lubricating oil compositions. Ethylene-propylene copolymers and ethylene-alpha olefin nonconjugated diene terpolymers which have been further derivatized to provide bifunctional properties in lubricating oil compositions illustrate this type of oil additive.

U.S. Pat. No. 4,089,794 discloses ethylene copolymers derived from ethylene and one or more $C_3$ to $C_{28}$ alpha-olefin solution grafted with an ethylenically-unsaturated carboxylic acid material followed by a reaction with a polyfunctional material reactive with carboxyl groups, such as a polyamine, a polyol, or a hydroxyamine which reaction product is useful as a sludge and varnish control additive in lubricating oils.

U.S. Pat. No. 4,137,185 discloses a stabilized imide graft of an ethylene copolymer additive for lubricants.

U.S. Pat. No. 4,146,489 discloses a graft copolymer where the backbone polymer is an oil-soluble ethylene propylene copolymer or an ethylene-propylene-diene modified terpolymer with a graph monomer of C-vinyl-pyridine or N-vinylpyrrolidone to provide a dispersant VI improver for lubricating oils.

U.S. Pat. No. 4,320,019 discloses a multipurpose lubricating additive prepared by the reaction of an interpolymer of ethylene and a C3-C8 alpha-monoolefin with an olefinic carboxylic acid acylating agent to form an acylating reaction intermediate which is then reacted with an amine.

U.S. Pat. No. 4,340,689 discloses a process for grafting a functional organic group onto an ethylene copolymer or an ethylene-propylene-diene terpolymer.

U.S. Pat. No. 4,357,250 discloses a reaction product of a copolymer and an olefin carboxylic acid via the "ene" reaction followed by a reaction with a monoaminepolyamine mixture.

U.S. Pat. No. 4,382,007 discloses a dispersant-VI improver prepared by reacting a polyamine-derived dispersant with an oxidized ethylene-propylene polymer or an ethylene-propylene diene terpolymer.

U.S. Pat. No. 4,144,181 discloses polymer additives for fuels and lubricants comprising a grafted ethylene copolymer reacted with a polyamine, polyol or hydroxyamine and finally reacted with an alkaryl sulfonic acid.

U.S. Pat. No. 5,932,525 teaches multi-grade lubricating oils comprising a low saturate base stock, less than three mass percent of an ashless dispersant and a viscosity modifier.

U.S. Pat. No. 5,427,702 discloses mixed ethylene alpha olefin copolymer multifunctional viscosity modifiers.

U.S. Pat. No. 4,863,623 teaches multifunctional olefin copolymer VI improvers.

U.S. Pat. No. 5,075,383 discloses a process for preparing a dispersant and antioxidant olefin copolymer additives, wherein free radical grafting is accompanied by the molecular weight reduction of the copolymers due to mechanically shearing.

U.S. Pat. No. 5,556,923 discloses oil solutions of adducted derivatized EPR or EPDM.

Grafted, functionalized olefin polymers would be desirable in the lubrication field which can be synthesized in a more convenient and/or efficient manner while providing comparable or even superior performance to current commercial grafted olefin copolymers.

SUMMARY OF THE INVENTION

The novel highly grafted, functionalized olefin polymer of the present invention comprises the reaction product of a method comprising reacting an acylating agent with a mixture comprising an olefin polymer having a number average molecular weight of between about 5,000 to about 100,000 and a non-volatile diluent, such as poly alpha olefin oligomers and/or solvent neutral base oil, in the presence of a free radical initiator to provide an acylated olefin polymer which is further reacted with an amine to provide the grafted functionalized olefin polymer dispersant.

In a particular embodiment, the acylating agent is grafted on the olefin polymer in the absence of solvents selected from alkanes, aromatic hydrocarbons, aromatics having a benzene nucleus, and saturated cyclic hydrocarbons.

The mixing of the olefin polymer, which preferably is an olefin copolymer, with a non-volatile diluent such as polyalphaolefin (PAO) oligomer, solvent neutral oils, rigorously refined base oils, makes it possible to reduce the viscosity of the olefin polymer with a component which does not interfere with the grafting or other functionalization reactions performed on the olefin polymer and which can remain in the finished product without impacting its functions, and which makes it possible to avoid use of a low boiling process solvent which must be removed during manufacture. This significantly reduces Volatile Organic Compound (VOC) concerns and handling requirements associated with the manufacturing of the grafted olefin polymer.

Novel lubricant compositions of the present invention also are provided comprising an oil of lubricating viscosity and an effective amount of the highly grafted, functionalized olefin polymer, in the form of additive concentrates or finished lubricants. These lubricant compositions can be used to lubricate gears, engines, transmissions, and other mechanical devices and components.

DETAILED DESCRIPTION OF THE PREFERRED EMBODIMENTS

A novel highly grafted, functionalized olefin polymer is provided as the reaction product of a method comprising reacting a mixture containing a polymer substrate comprising a polymer of ethylene and one or more $C_3$ to $C_{23}$ alpha-olefins and a non-volatile diluent; grafting the polymer substrate with an acylating agent to provide an intermediate product; vacuum stripping of certain volatile components; and amination of the intermediate product. In this manner, a highly grafted, functionalized olefin polymer product is provided. A lubricant composition is provided by dilution of the novel highly grafted, functionalized olefin polymer in an oil of lubricating viscosity. The lubricant composition may be beneficially used as a dispersant.

Polymer Substrate Starting Material

The polymer substrate starting material for use in one embodiment of the present invention preferably comprises copolymers of ethylene and one or more $C_3$ to $C_{23}$ alpha-olefins. Co-polymers of ethylene and propylene are most preferred. Other alpha-olefins suitable in place of propylene to form the polymer or to be used in combination with ethylene and propylene to form a terpolymer include 1-butene, 1-pentene, 1-hexene, 1-octene and styrene; á,ù-diolefins such as 1,5-hexadiene, 1,6-heptadiene, 1,7-octadiene; branched chain alpha-olefins such as 4-methylbutene-1,5-methylpentene-1 and 6-methylheptene-1; and mixtures thereof.

Methods for making the polymer substrate are also described, e.g., in U.S. Pat. Nos. 4,863,623, 5,075,383, and 6,107,257, which descriptions are incorporated herein by reference.

A broad range of olefin polymers may be used in the practice of the present invention including copolymers and/or olefin polymers containing a small termonomer content. For instance, more complex polymer substrates, often designated as interpolymers, may be prepared using a third component. The third component generally used to prepare an interpolymer substrate is a polyene monomer selected from nonconjugated dienes and trienes. The non-conjugated diene component is one having from 5 to 14 carbon atoms in the chain. Preferably, the diene monomer is characterized by the presence of a vinyl group in its structure and can include cyclic and bicyclo compounds. Representative dienes include 1,4-hexadiene, 1,4-cyclohexadiene, dicyclopentadiene, 5-ethylidene-2-norbornene, 5-vinyl-2-norbornene, 5-methylene-2-norbornene, 1,5-heptadiene, and 1,6-octadiene. A mixture of more than one diene can be used in the preparation of the interpolymer. A preferred nonconjugated diene for preparing a terpolymer or interpolymer substrate is 1,4-hexadiene. The triene component will have at least two nonconjugated double bonds, and up to about 30 carbon atoms in the chain. Typical trienes useful in preparing the interpolymer of the invention are 1-isopropylidene-3á,4,7,7á-tetrahydroindene, 1-isopropylidenedicyclopentadiene, dihydro-isodicyclopentadiene, and 2-(2-methylene-4methyl-3-pentenyl)[2.2.1] bicyclo-5-heptene.

Ethylene-propylene or higher alpha-olefin copolymers may consist of from about 10 to 70 mole percent ethylene and from about 90 to 30 mole percent $C_3$ to $C_{23}$ alpha-olefin with the preferred mole ratios being from about 25 to 65 mole percent ethylene and from about 75 to 35 mole percent of a $C_3$ to $C_{23}$ alpha-olefin, with the more preferred proportions being from 40 to 60 mole percent ethylene and 60 to 40 mole percent $C_3$ to $C_{23}$ alpha-olefin, and the most preferred proportions being from 45 to 58 mole percent ethylene and 55 to 42 mole percent $C_3$ to $C_{23}$ alpha-olefin.

Terpolymer variations of the foregoing polymers may contain from about 0.1 to 1.0 mole percent of non-conjugated diene or triene. For instance, a small amount of termonomer, such as less than 0.15 mole percent, alternatively described as 0.5 wt. %, may be present in the polymer substrate.

The polymer substrate, that is, the ethylene copolymer or terpolymer, is an oil-soluble, linear or branched polymer having a number average molecular weight from about 5,000 to about 100,000 as determined by gel permeation chromatography and universal calibration standardization, with a preferred number average molecular weight range of 5,000 to about 85,000 and more preferably about 7,000 to about 50,000. Polymer substrate starting materials having these molecular weights usually do not need to be sheared or degraded during processing to reduced values in order to be processed in the desired manner.

The term "polymer" is used generically to encompass copolymers, terpolymers, interpolymers, and so forth. These materials may contain minor amounts of other olefinic monomers so long as the basic characteristics of the polymers are not materially changed.

Non-Volatile Diluent for Polymer Substrate Mixture

The polymer substrate starting material comprising (co) polymers of ethylene and one or more $C_3$ to $C_{23}$ alpha-olefins tends to be a relatively viscous substance under the grafting and functionalization process conditions such as described herein. Non-volatile diluent is pre-mixed with the olefin polymer forming a homogenous mixture. Non-volatile diluent is mixed at an optimal amount to improve and facilitate acylation of the olefin polymer. The non-volatile diluent used contains a low sulfur content. Sulfur is an undesirable impurity which interferes with the acylating reaction. Sulfur is becoming undesirable in finished lubricant formulation because sulfur interferes with emission control systems. Effective diluents are paraffinic materials, preferably are saturated non-branched paraffinic refined base oil, most preferably synthetic alpha-olefin oligomers (also referred to herein as poly-alpha-olefins or "PAO's"). When the olefin polymer is mixed with such alpha-olefin oligomers before acylation and amination (and other functionalization), it has been found that the ultimate reaction products have improved clarity measured by light transmittance devices as compared to polymer substrates processed similarly without diluent or high sulfur containing diluent.

In one embodiment, the diluent oil comprised of alpha-olefin oligomers generally contain less than about 50 ppm sulfur content, and particularly less than about 1 ppm sulfur content, most particularly an non-delectable amount of sulfur. The availability of low sulfur diluent oils either saturated paraffinic or synthetic alpha-olefin oligomers makes it possible to in turn improve the clarity and quality of reaction products made in its presence according to embodiments of the invention. The base oil typically has a kinematic viscosity at 100° C. (KV100) ranging from about 1 to 100 centistokes (cSt), particularly about 2 to 20 cSt, and more particularly about 2 to 5 cSt.

The alpha-olefin oligomers generally may comprise, for example, the product of catalyzed oligomerization of $C_6$ or higher alpha-olefin monomers. In one embodiment, the alpha-olefin monomers useful in preparing the oligomers predominantly are vinyl olefins (i.e., 1-alkenes) containing about 8-12 carbon atoms such as 1-octene, 1-decene, 1-dodecene and the like mixtures thereof. In one particular embodiment, the alpha-olefin monomer is 1-decene or an olefin mixture containing predominantly 1-decene (e.g., at least 75 wt. % 1-decene).

In one embodiment, the base oil comprises oligomer products which comprise of oligomeric mixtures which include varying amounts of dimer, trimer, tretramer, pentamer, and higher oligomers of the monomers, depending on the particular alpha-olefin, catalyst and reaction conditions.

The product viscosity can be further adjusted by either removing or adding higher or lower oligomers to provide a composition having a useful viscosity for the olefin polymer. For example, the oligomers may be hydrogenated to improve their oxidation resistance.

Suitable catalysts for making alpha-olefin oligomers include Friedel Crafts catalysts such as $BF_3$ with a promoter such as water or an alcohol. Alternative processes for producing synthetic oils include forming vinylidene dimers of vinyl-olefins using a Ziegler catalyst, for example, such as described in U.S. Pat. Nos. 2,695,327 and 4,973,788 which dimer can be further dimerized to a tetramer using Friedel-Crafts catalyst, such as described in U.S. Pat. Nos. 3,576,898 and 3,876,720. Suitable processes for making useful dimerized vinylidene olefins are described, for example, in U.S. Pat. Nos. 4,172,855 and 4,973,788.

In another embodiment, the base oil material may be a synthetic oil prepared by isomerizing a vinylidene olefin to form a tri-substituted olefin containing intermediate, and then reacting the intermediate with a vinyl olefin in the presence of a catalyst to form an oil which is predominantly a co-dimer of the vinylidene olefin and the vinyl olefin, e.g., such as described in U.S. Pat. No. 5;284,988 (Schaerfl, Jr. et al.), which descriptions are incorporated herein by reference. In one particular embodiment, the base oil is prepared by isomerizing at least a portion of a vinylidene olefin feed, e.g., a dimer of a vinyl olefin monomer containing about 4 to 30 carbon atoms, to form an intermediate which preferably contains at least 50 wt % tri-substituted olefin, and reacting the intermediate and a vinyl olefin, e.g., a vinyl olefin containing about 4 to 30 carbon atoms, in the presence of a catalyst to form a synthetic base oil containing at least about 50 wt. % of the reaction product of the intermediate and vinyl olefin. In one embodiment, the mole ratio of trisubstituted olefin to vinyl olefin is from about 20:1 to about 1:20.

Useful alpha-olefin oligomers may also be commercially obtained. Examples include Synfluid PAO-4, manufactured by Chevron Phillips Chemicals and include Durasyn 164, manufactured by BP Petrochemicals. Other useful alpha-olefin oligomers include Group IV base stocks.

The diluent also may comprise solvent neutral base oils, such as Group I, Group II, or Group III base stocks, or base oil blends thereof. The diluent also may comprise a combination of alpha olefin oligomers and solvent neutral base oil.

Mixture of Polymer Substrate and Non-Volatile Diluent

For acylating, the polymer substrate generally is combined with the diluent in an amount effective to provide a mixture having an optimum kinematic viscosity at 100° C. (KV100) ranging from about 250 to 750 centistokes (cSt), particularly about 1,200 to 3,500 cSt, and more particularly about 6,000 to 20,000 cSt. The diluent's kinematic viscosity at 100° C. (KV100) in the mixture ranges from about 1 to 100 centistokes (cSt), particularly about 2 to 20 cSt, and more particularly about 2 to 5 cSt. A homogeneous mixture can be readily formed using moderate agitation or stirring of the combined polymer substrate and diluent such as alpha-olefin oligomer components and/or highly refined solvent neutral base oils. For purposes herein, a mixture of the polymer substrate and PAO and/or highly refined solvent neutral base oil refers to a solventless or essentially solventless combination including these components.

Acylating Agents—Graft Monomers

A graft monomer is next grafted onto the polymer backbone of the polymer substrate to form an acylated ethylene (co)polymer. Suitable graft monomers include ethylenically unsaturated carboxylic acid materials, such as unsaturated dicarboxylic acid anhydrides and their corresponding acids. Examples of these graft monomers are set forth, for example, in U.S. Pat. No. 5,837,773, which descriptions are incorporated herein by reference. These carboxylic reactants which are suitable for grafting onto the ethylene polymer contain at least one ethylenic bond and at least one, preferably two, carboxylic acid or its anhydride groups or a polar group which is convertible into said carboxyl groups by oxidation or hydrolysis. Preferably, the carboxylic reactants are selected from the group consisting of acrylic, methacrylic, cinnamic, crotonic, maleic, fumaric and itaconic reactants. More preferably, the carboxylic reactants are selected from the group consisting of maleic acid, fumaric acid, maleic anhydride, or a mixture of two or more of these. Maleic anhydride or a derivative thereof is generally most preferred due to its commercial availability and ease of reaction. In the case of unsaturated ethylene copolymers or terpolymers, itaconic acid or its anhydride is preferred due to its reduced tendency to form a cross-linked structure during the free-radical grafting process.

The ethylenically unsaturated carboxylic acid materials typically can provide one or two carboxylic groups per mole of reactant to the grafted polymer. That is, methyl methacrylate can provide one carboxylic group per molecule to the grafted polymer while maleic anhydride can provide two carboxylic groups per molecule to the grafted polymer.

The carboxylic reactant is grafted onto the prescribed polymer backbone in an amount to provide 0.3 to 0.75 carboxylic groups per 1000 number average molecular weight units of the polymer backbone, preferably 0.3 to 0.5 carboxylic groups per 1000 number average molecular weight. For example, a copolymer substrate with Mn of 20,000 is grafted with 6 to 15 carboxylic groups per polymer chain or 3 to 7.5 moles of maleic anhydride per mole of polymer. A copolymer with Mn of 100,000 is grafted with 30 to 75 carboxylic groups per polymer chain or 15 to 375 moles of maleic anhydride per polymer chain. The minimum level of functionality is the level needed to achieve the minimum satisfactory dispersancy performance.

The grafting reaction to form the acylated olefin polymers is generally carried out with the aid of a free-radical initiator with adequent mixing. The grafting reaction may be conducted near atmospheric conditions (e.g., absolute pressure 14 to 16 lbf./in$^2$). The present invention makes it possible to use more economical process equipment and control arrangements. Control of the viscosity of the grafting reaction mass via non-volatile dilutent such as alpha-olefin oligomer, PAO, or high refined solvent neutral base oil is important. The reaction mass generally contains the non-volatile diluent in an amount effective to reduce the viscosity of the reaction mass and allow homogenous mixture of the polymer substrate in the reaction mass yet without interfering with the grafting reaction or impairing the reaction product.

As another advantage associated with the provision and use of the polymer substrate and diluent mixture, graft polymerization may be carried out in the absence of hydrocarbon volatile solvents, including those otherwise conventionally used in this general grafting reaction. For purposes herein, a "solvent" refers to a liquid substance capable of dissolving another substance, without the solvent be itself being reacted with the acylating agent. The hydrocarbon solvents that can be omitted according to embodiments of the present invention include solvents that generally are more volatile than the reactants of the grafting and amination reactions described herein, for example, solvents having a boiling point less than about 160° C. under standard atmospheric pressure conditions (i.e., approximately 14.7 lb./in$^2$ absolute). The solvents that can be omitted include, for example, open-chain aliphatic compounds such as $C_9$ or lower alkanes, alkenes and alkynes (e.g., $C_5$ to $C_8$ alkanes such as hexane); aromatic hydrocarbons (e.g., compounds having a benzene nucleus such as benzene and toluene); alicyclic hydrocarbons such as saturated cyclic hydrocarbons (e.g., cyclohexane); ketones; or any combinations of these. In one embodiment, it is desirable to omit all solvents having boiling points approximating or lower than that of nonane under standard atmospheric conditions. Some conventional grafting reactions have been performed in the presence of considerable amounts of hydrocarbon solvent, such as approximately 15% to 25% hexane content. By comparison, in one embodiment of the present invention, the total amount of these types of such solvents in the grafting reaction mass does not exceed 0.1 wt. % content thereof. This significantly reduces overall VOC handling requirements of the inventive manufacturing methods. The resulting polymer intermediate is characterized by having carboxylic acid acylating functionality randomly within its structure.

In the bulk process for forming the acylated olefin (co) polymers, the olefin polymer mixture with non-volatile diluent such as alpha-olefin oligomers (PAO) is fed to processing equipment, such as a batch reactor vessel or continuous plug-flow reactor, heated to a temperature of 150° C. to 400° C., and the ethylenically unsaturated carboxylic acid reagent and free-radical initiator are separately co-fed to the mixed polymer substrate to effect grafting. The reaction usually is carried out under mixing conditions which do not effect shearing of ethylene polymers sufficient to reduce their molecular weight. The batch processing equipment is generally blanketed with nitrogen to prevent oxidation of the polymer. The residence time in the processing equipment is sufficient to provide for the desired degree of acylation. Diluent oils, such as solvent neutral base oils—Group I, highly refined minerals—Group II or Group III, or synthetic lubricating oils may optionally be added to the processing equipment after the venting stage to furthur dilute the acylated polymer.

The free-radical initiators which may be used to graft the ethylenically unsaturated carboxylic acid material to the polymer backbone include peroxides, hydroperoxides, peresters, and also azo compounds and preferably those which have a boiling point greater than 100° C. and decompose thermally within the grafting temperature range to provide free radicals. Representatives of these free-radical initiators are azobutyronitrile, dicumyl peroxide, 2,5-dimethylhexane-2,5-bis-tertiarybutyl peroxide and 2,5-dimethylhex-3-yne-2,5-bis-tertiary-butyl peroxide. The initiator is used in an amount of between about 0.005% and about 1% by weight based on the weight of the reaction mixture.

Other methods known in the art for effecting reaction of ethylene-olefin (co)polymers with ethylenically unsaturated carboxylic reagents, such as halogenation reactions, thermal or "ene" reactions or mixtures thereof, can be used instead of the free-radical grafting process. Such reactions are conveniently carried out in mineral oil or bulk by heating the reactants at temperatures of 250° C. to 400° C. under an inert atmosphere to avoid the generation of free radicals and oxidation byproducts. "Ene" reactions are a preferred method of grafting when the ethylene-olefin polymer contains unsaturation. To achieve the high graft levels, 0.3 to 0.5 carboxylic groups per 1000 Mn, desired by this invention it may be necessary to follow or precede the "ene" or thermal graft reaction with a free radical graft reaction.

Upon completion of the grafting reaction, unreacted carboxylic reactant and free radical initiator usually are removed before further functionalization is performed on the intermediate grafted product. The unreacted components may be eliminated from the reaction mass by vacuum stripping, e.g., the reaction mass may be heated to temperature of about 150 to about 250° C. under agitation with a vacuum applied for a period sufficient to remove the volatile unreacted unreacted carboxylic reactant and free radical initiator ingredients.

Amination

The polymer intermediate possessing carboxylic acid acylating functions is reacted with a polyamine compound. The polyamine compound may be selected from polyamine compounds such as described, e.g., in U.S. Pat. Nos. 4,863,623, 5,075,383, and 6,107,257, which descriptions are incorporated herein by reference. In one embodiment, the polyamine compound is an N-arylphenylenediamine represented by the general formula:

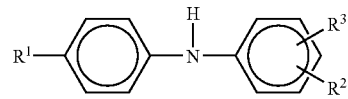

in which $R^1$ is hydrogen, —NH-aryl, —NH-arylalkyl, —NH-alkyl, or a branched or straight chain radical having from 4 to 24 carbon atoms that can be alkyl, alkenyl, alkoxyl, aralkyl, alkaryl, hydroxyalkyl or aminoalkyl; $R^2$ is —$NH_2$, $CH_2$—$(CH_2)_n$—$NH_2$, $CH_2$-aryl-$NH_2$, in which n has a value from 1 to 10 and $R^3$ is hydrogen, alkyl, alkenyl, alkoxyl, aralkyl, alkaryl having from 4 to 24 carbon atoms.

Particularly preferred polyamines for use in the present invention are the N-arylphenylenediamines, more specifically the N-phenylphenylenediamines, for example, N-phenyl-1,4-phenylenediamine, N-phenyl-1,3-phenylendiamine, and N-phenyl-1,2-phenylenediamine.

It is preferred that the polyamines contain only one primary amine group so as to avoid coupling and/or gelling of the olefin polymers.

The reaction between the polymer substrate intermediate having grafted thereon carboxylic acid acylating function and the prescribed polyamine compound is preferably con-ducted by heating a solution of the polymer substrate under inert conditions and then adding the polyamine compound to the heated solution generally with mixing to effect the reaction. It is convenient to employ an oil solution of the polymer substrate heated to 140 to 175° C. under atmospheric pressure conditions, while maintaining the reaction mixture under a nitrogen blanket. The polyamine compound is added to this solution and the reaction is effected under the noted conditions.

Typically, the polyamine compound(s) is (are) dissolved in or with a surfactant and added to a mineral or synthetic lubricating oil or solvent solution containing the acylated olefin polymer. This solution is heated with agitation under an inert gas at a temperature in the range of 120° C. to 200° C. as described in U.S. Pat. No. 5,384,371, the disclosure of which is herein incorporated by reference. The reactions are carried out conveniently in a stirred reactor under nitrogen purge.

Surfactants which may be used in carrying out the reaction of the acylated olefin polymer with the polyamine(s) include but are not limited to those characterized as having (a) solubility characteristics compatible with mineral or synthetic lubricating oil, (b) boiling point and vapor pressure characteristics so as not to alter the flash point of the oil and (c) polarity suitable for solubilizing the polyamine(s). A suitable class of such surfactants includes the reaction products of aliphatic and aromatic hydroxy compounds with ethylene oxide, propylene oxide or mixtures thereof. Such surfactants are commonly known as aliphatic or phenolic alkoxylates. Representative examples are SURFONIC® L-24-2, NB40, N-60, L-24-5, L-24-7 (Huntsman Chemical Company), Neodol® 23-5 and 25-7 (Shell Chemical Company) and Tergitol® surfactants (Union Carbide). Preferred surfactants include those surfactants that contain a functional group, e.g., —OH, capable of reacting with the acylated olefin polymer.

The quantity of surfactant used depends in part on its ability to solubilize the polyamine. In one preferred embodiment, the polyamine compound is added in an amount sufficient to theoretically react with all of the grafted carboxylic groups. Typically, concentrations of 5 to 40 wt. % polyamine are employed. The surfactant can also be added separately, instead of or in addition to the concentrates discussed above, such that the total amount of surfactant in the finished additive is 10 wt. % or less.

The acylated olefin polymer also may be color stabilized after the amination reaction, such as by reacting the excess primary amine with a $C_7$ to $C_{12}$ alkyl aldehyde (e.g., nonyl aldhehyde). For example, the reaction may proceed with the alkyl aldehyde agent added in an amount of about 0.2 to about 0.6 wt. % under similar temperature and pressure conditions as used in the amination reaction for about 2 to about 6 hours.

Lubricating Compositions and Uses

The highly grafted, functionalized olefin polymer products of the present invention can be incorporated into lubricating oil in any convenient way. Thus, the highly grafted, multifunctional olefin polymers can be added directly to the lubricating oil by dispersing or dissolving the same in the lubricating oil at the desired level of concentration. Such blending into the lubricating oil can occur at room temperature or elevated temperatures. Alternatively, the highly grafted, functionalized olefin polymers can be blended with a suitable oil-soluble solvent/diluent (such as benzene, xylene, toluene, lubricating base oils and petroleum distillates) to form a concentrate, and then blending the concentrate with a lubricating oil to obtain the final formulation. Such additive concentrates will typically contain (on an active ingredient (A.I.) basis) from about 3 to about 45 wt. %, and preferably from about 10 to about 35 wt. %, highly grafted, functionalized olefin polymer additive, and typically from about 20 to 90 wt %, preferably from about 40 to 60 wt %, base oil based on the concentrate weight.

The highly grafted, functionalized olefin polymer products of the present invention find their primary utility in lubricating oil compositions which employ a base oil in which the additives are dissolved or dispersed. Such base oils may be natural, synthetic or mixtures thereof. Base oils suitable for use in preparing the lubricating oil compositions of the present invention include those conventionally employed as crankcase lubricating oils for spark-ignited and compression-ignited internal combustion engines, such as automobile and truck engines, marine and railroad diesel engines, and the like. Advantageous results are also achieved by employing the additive mixtures of the present invention in base oils conventionally employed in and/or adapted for use as power transmitting fluids, heavy duty hydraulic fluids, power steering fluids and the like. Gear lubricants, industrial oils, pump oils and other lubricating oil compositions can also benefit from the incorporation therein of the additive mixtures of the present invention.

These lubricating oil formulations conventionally contain additional additives that will supply the characteristics that are required in the formulations. Among these types of additives are included additional viscosity index improvers, anti-oxidants, corrosion inhibitors, detergents, dispersants, pour point depressants, antiwear agents, antifoaming agents, demulsifiers and friction modifiers. All tests are based upon an SAE 5W-30 fully formulated passenger car motor oil.

In the preparation of lubricating oil formulations it is common practice to introduce the additives in the form of 10 to 80 wt. % active ingredient concentrates in hydrocarbon oil, e.g. mineral lubricating oil, or other suitable solvent.

Usually these concentrates may be diluted with 3 to 100, e.g., 5 to 40, parts by weight of lubricating oil per part by weight of the additive package in forming finished lubricants, e.g. crankcase motor oils. The purpose of concentrates, of course, is to make the handling of the various materials less difficult and awkward as well as to facilitate solution or dispersion in the final blend. Thus, the highly grafted, functionalized olefin polymer would usually be employed in the form of a 10 to 50 wt. % concentrate, for example, in a lubricating oil fraction.

The highly grafted, functionalized olefin polymers of the present invention will generally be used in admixture with a lube oil base stock, comprising an oil of lubricating viscosity, including natural lubricating oils, synthetic lubricating oils and mixtures thereof.

Natural oils include animal oils and vegetable oils (e.g., castor, lard oil), liquid petroleum oils and hydrorefined, solvent-treated or acid-treated mineral lubricating oils of the paraffinic, naphthenic and mixed paraffinic-naphthenic types. Oils of lubricating viscosity derived from coal or shale are also useful base oils. The synthetic lubricating oils used in this invention include one of any number of commonly used synthetic hydrocarbon oils, which include, but are not limited to, poly-alpha-olefins, alkylated aromatics, alkylene oxide polymers, interpolymers, copolymers and derivatives thereof here the terminal hydroxyl groups have been modified by esterification, esterification etc, esters of dicarboxylic acids and silicon-based oils.

The present invention is further directed to a method of improving fuel economy and fuel economy durability of a vehicle wherein said method comprises adding to and operating in the crankcase of the vehicle the lubricating oil composition described above.

Also, a method of extending lubricant drain intervals in a vehicle is contemplated. Said method comprises adding to and operating in the crankcase of the vehicle the lubricating oil composition described above.

A method of improving the low temperature properties of a lubricating oil is also contemplated. The comprising of combining an oil of lubricating viscosity with the highly grafted, functionalized olefin polymer.

The highly grafted, functionalized olefin polymers of the present invention may be post-treated so as to impart additional properties necessary or desired for a specific lubricant application. Post-treatment techniques are well known in the art and include boronation, phosphorylation, and maleination.

The following examples illustrate the preparation of the highly grafted, functionalized olefin polymers of the present invention.

EXAMPLES

Example I

A highly grafted (0.37 carboxylic groups/1000 Mn), functionalized dispersant was prepared in the following manner.

1. Grafting EP-Polymer

An ethylene-propylene (EP) copolymer (CP80K EP-polymer, Crompton) having a number average molecular weight of approximately 5,000 to 20,000 was used as a reaction starting material having a kinematic viscosity at 100° C. (KV100) of about 320 to about 650 cSt at 32 wt. % in diluted solution in 100N base oil. Neat EP-polymer was a highly tacky and waxy material at room temperature. KV100 of neat material was expected to be about 35,000 to 100,000 cSt. 110 pounds EP-polymer and 12.2 pounds poly-alpha olefin oligomer of about 4 cSt at 100° C. (PAO-4, Chevron Phillips Chemicals) was charged to a reactor with the mixture kept under a nitrogen atmosphere. The EP-polymer/poly-alpha olefin oil mixture was estimated to have a KV100 of about 1500 cSt at 170° C. 2.76 pounds maleic anhydride was added to the mixture in the reaction vessel and the reaction mass with agitation providing thorough mixing. The reaction mass was heated to 170° C. at which point 0.73 pounds of dicumyl peroxide were added. The resulting reaction mass was heated at 170° C. for one hour under atmospheric pressure.

The total acid number (TAN) meq acylating agent/gram of reaction mixture was measured. The TAN value was used to estimate the degree of grafted acylating agent, which is also referenced as degree of graft (DOG), defined as the mass grafted acylating agent per 100 mass grafted copolymer. The TAN was measured at 0.19 meq/gram. This TAN includes both grafted and ungrafted acylating resulting acylating agent charged was 2.5 parts maleic anhydride per 100 parts Ethylene-Propylene copolymer in the reaction mixture.

2. Vacuum Stripping

Unreacted maleic anhydride and peroxide by-products were removed with vacuum stripping. The reaction mass was heated from 170° C. to 230° C. A vacuum of greater than 28 inches Hg vacuum gauge (less than 1.9 inches Hg absolute) was applied for one hour under agitation.

The total acid number (TAN) of the isolated product was measured to be 0.17 meq/gram and an estimated DOG value of 1.6%. The isolated grafted polymer had a number average molecular weight of approximately 5,000 to 30,000 as determined by gel permeation chromatography.

3. Amination and Color Stabilization

About 124 pounds of product of the vacuum stripping procedure was mixed with 179 pounds 100N base oil. The temperature of the mixture was raised to 160° C. When the reaction mass reached 160° C., 4.23 pound of n-phenyl-p-phenylene diamine (NPPDA) and 8.24 pounds ethoxylated lauryl alcohol were added with agitation. The reaction was allowed to proceed for 42 hours at 160° C. under a nitrogen atmosphere. 1.3 pounds of nonyl aldehyde was added to the remainder of the reaction mass under agitation and the resulting mixture was allowed to react for four hours at 160° C. with agitation under a nitrogen atmosphere.

Small separate samples of the reaction product were taken for analyses, including the following: kinematic viscosity at 100° C. (ASTM D445) giving 963 cSt. Infrared spectral analyses on the polymer solution and on extracted polymeric residues indicated that the desired polymeric succinimide was formed.

4. Dilution

The functionalized reaction product composition (317 pounds) was diluted with 11 pounds of 100N base oil providing a concentrate having a KV100 of 705-885 cSt. Small separate samples of the reaction product were taken for analyses, including the following: kinematic viscosity (cSt at 100° C.)(ASTM D445-95) giving 836 cSt; kinematic viscosity at 40° C. (ASTM D445) giving 22,300 cSt, color (ASTM D1500) giving 3.0, color Quest haze giving 19; NTU haze giving 22; and total nitrogen (ASTM D5762) giving 0.214 wt %.

Fully formulated oils containing the grafted ethylene-propylene polymer dispersant of the present invention (e.g., Example 1) achieve significant and unexpected benefits for dispersion of soot and sludge in diesel engines.

This viscosity control may also have the following consequential benefits to the lubricant: improved pump ability, improved wear, improved fuel economy, and improvements in extended drain applications.

While the invention has been particularly described with specific reference to particular process and product embodiments, it will be appreciated that various alterations, modifications and adaptations may be based on the present disclosure, and are intended to be within the spirit and scope of the present invention as defined by the following claims.

What is claimed is:

1. A lubricating oil composition comprising:
a major amount of an oil of lubricating viscosity; and
a minor amount of a grafted functionalized olefin polymer prepared by a method comprising reacting an acylating agent with a mixture comprising
an olefin polymer having a number average molecular weight of between about 20,000 to about 100,000 and
a diluent in the presence of a free radical initiator to provide an acylated olefin polymer which is further reacted with a polyamine,
wherein the diluent is selected from the group consisting of alpha-olefin oligomers, highly refined solvent neutral base oil, and combinations thereof.

2. The lubricating oil composition of claim 1, further comprising at least one additive selected from the group consisting of additional viscosity index improvers, antioxidants, corrosion inhibitors, detergents, dispersants, pour point depressants, antiwear agents, antifoaming agents, demulsifiers and friction modifiers.

3. The lubricating oil composition of claim 1, wherein the oil of lubricating viscosity is selected from the group consisting of natural oils, synthetic oils and mixtures thereof.

4. A method of lubricating an internal combustion engine wherein said method comprises adding to the crankcase of said internal combustion engine the lubricating oil composition of claim 1.

5. A method of lubricating a transmission of an internal combustion engine comprising lubricating said transmission with the lubricating oil composition of claim 1.

6. The lubricating oil composition of claim 1, wherein the acylating agent is an ethylenically unsaturated carboxylic reactant.

7. The lubricating oil composition of claim 1, wherein the acylating agent is reacted with the olefin polymer in the absence of solvents selected from open-chain aliphatic hydrocarbons, aromatic hydrocarbons, alicyclic hydrocarbons, and ketones.

8. The lubricating oil composition of claim 1, wherein the acylating agent is reacted with the olefin polymer in the absence of solvents selected from $C_9$ or lower alkanes, $C_9$ or lower alkenes, $C_9$ or lower alkynes, aromatic hydrocarbons having a benzene nucleus, alicyclic hydrocarbons having a boiling point no greater than that of nonane, and ketones having a boiling point no greater than that of nonane.

9. The lubricating oil composition of claim 1, wherein the olefin polymer contains termonomer in an amount not exceeding about 0.5 wt.%.

10. The lubricating oil composition of claim 1, wherein the reaction mixture during the grafting step comprises about 75 to about 100 wt.% of the olefin polymer and up to 25 wt.% of the alpha-olefin oligomer or highly refined solvent neutral base oil.

11. The lubricating oil composition of claim 1, wherein the olefin polymer comprises a copolymer of ethylene and one or more $C_3$-$C_{23}$ alpha olefins.

12. The lubricating oil composition of claim 1, wherein the olefin polymer has a number average molecular weight of between about 5,000 to about 30,000.

13. The lubricating oil composition of claim 1, wherein the acylated olefin polymer comprises copolymers or terpolymers of ethylene and $C_3$ to $C_{23}$ alpha-olefin and optionally a nonconjugated diene or triene on which has been grafted ethylenically unsaturated carboxylic reactants to a level of 0.3 to 0.75 carboxylic groups per 1000 number average molecular weight units (Mn).

* * * * *